United States Patent [19]

Titan

[11] Patent Number: 5,745,654
[45] Date of Patent: Apr. 28, 1998

[54] FAST EXPLANATIONS OF SCORED OBSERVATIONS

[75] Inventor: Hari Titan, La Jolla, Calif.

[73] Assignee: HNC Software, Inc., San Diego, Calif.

[21] Appl. No.: 600,858

[22] Filed: Feb. 13, 1996

[51] Int. Cl.[6] .................... G06E 1/00; G06E 3/00; G06F 15/18; G06G 7/00
[52] U.S. Cl. .................... 395/22; 395/21; 395/23; 395/76
[58] Field of Search .................... 395/22, 26, 21, 395/23, 11, 76, 51

[56] References Cited

U.S. PATENT DOCUMENTS

| 5,398,300 | 3/1995 | Levey | 395/22 |
| 5,559,925 | 9/1996 | Austin | 395/2.4 |

OTHER PUBLICATIONS

Poh, Hean Lee and Jasic, Teo. "Forecasting and Analysis of Marketing Data Using Neural Networks: A Case of Advertising and Promotion Imapct" Artificial Intelligence for Applications 1995 Conference, pp. 224–230, 1995.
Klimasauskas, Casimir C. "Neural Nets Tell Why" Dr. Dobb's Journal, vol. 16, No. 4, pp. 16–24, Apr. 1991.

*Primary Examiner*—Tariq R. Hafiz
*Assistant Examiner*—Jason W. Rhodes
*Attorney, Agent, or Firm*—Fenwick & West LLP

[57] ABSTRACT

A system, method, and product provide rapid explanations for the scores determined by a neural network for new observations input into the neural network. The explanations are associated with a table of percentile bins for each of the input variables used to define the observation. The table contains for each input variable a number of percentile bins. Each percentile bin contains an expected score for values of the input variable containing with the percentile bin. The expected score in each percentile bin is determined from historical observation data. Preferably each percentile bin is associated with an explanation that describes the meaning of the value of the input variable falling within the percentile bin. During observation processing, a new observation is scored. The value of each input variable in the new observation is compared with the percentile bins for the input variable in the table. The expected score in the percentile bin that contains the value of the input variable is retrieved, and this is repeated for all input variables in the new observation. The explanation associated with the percentile bin that has an expected score closest to the actual score is retrieved and provided as the explanation of the most significant input variable accounting for score. Other explanations from the next closest expected scores may also be retrieved.

21 Claims, 6 Drawing Sheets

| SHOW | MODES | SELECTION | CRITERIA | ORDER | REVIEW CASE | | |
|---|---|---|---|---|---|---|---|

Account Information

| | | | | | Cardholder Information | | |
|---|---|---|---|---|---|---|---|
| Account: | 441711045210677​2 | | Block CD: | No | Address Information | | |
| Name 1: | Claire Vopant | | | _210_ | Addr 1: | 1623 Peachtree Way | |
| Name 2: | None | | | | Addr 2: | None | |
| SSN 1: | 372165258 | SSN 2: | | | City: | Washington | |
| DOB 1: | 3/21/48 | DOB 2: | 4/19/35 | | State: | DC | Zip: 20002321​1 |
| Exp.Date: | 5/1/96 | Account Open: | 5/1/91 | | | Phone Numbers | |
| Maiden: | | | | | Home | 4045521619 | |
| | | | | | Work | 4045216978 | |

REASONS

4 - Suspicious high dollar activity
5 - Suspicious dollar amounts
6 - Suspicious geographic activity Manual Dial

Rolling Authorization Transactions

| TRN_DT | TRN_AMT | FRD_SCOR | DECL_CD | SIC_CD | MER_ZIP | AVAL_CR | CR |
|---|---|---|---|---|---|---|---|
| 10/8/93  8:00:03 AM | $11.00 | 699 | P | 5641 | 381180000 | $989.00 | 0 |
| 10/3/93 12:16:49 PM | $1.00 | 990 | D | 5542 | 207050000 | $422.00 | 0 |
| 10/3/93 12:01:40 PM | $1.00 _220_ | 990 | D | 5542 | 208110000 | $422.00 | 0 |
| 10/3/93 12:47:59 AM | $1.00 | 990 | D | 5542 | 207050000 | $422.00 | 0 |
| 10/1/93  8:22:53 PM | $1.00 | 977 | A | 5542 | 207050000 | $472.00 | 0 |

[ Exit ]  [ Logoff ]                      [ Status ]                                      [ Find Case ]  [ Skip Case ]

[QTYPE: DEFAULT QUEUE] [QMODE: Round Robin] [SMODE: Auto]  0

_230_

FAST EXPLANATIONS OF SCORED OBSERVATIONS

BACKGROUND

1. Field of Invention

This invention relates generally to the field of neural network scoring engines and specifically to the field of fast explanations for neural network scores, without scoring fabricated neural network inputs.

2. Background of Invention

Neural networks are computational systems that are generally capable of modeling the non-linear aspects of complex data sets. In particular, a neural net is capable of being trained with a set of observations, each observation comprising values for a set input variables, and a known value of an output variable. From this set of observations, the neural net develops a set of weightings that model a complex function describing the relationship between the input set and an output. Once so trained, inputs for a new observation can be provided to the neural net, which will then produce an output, or a neural network score based on the learned model. This score may then be used for classification, pattern matching, and the like, with scores in particular ranges being associated with determined categories in the output space.

One known problem with neural nets is that they conventionally do not inherently include mechanisms that provide an explanation of a particular output or score, or how it was generated for a particular input set. This is because the function that maps the input to the output score is opaque, held by the weightings in the neural net. Thus, conventional neural nets are limited in how well they can explain the reasons for a particular scoring, such as a classification of an input.

For example, neural nets are used in credit card fraud detection to, detect whether a particular transaction is fraudulent. The input here may be a set of variables describing the transaction, such as amount, location, item, time, last transaction and the like. Similarly, neural nets are used in loan analysis to determine whether a particular borrower is credit worthy; here the input is a set of variables describing the loan amount, salary, credit experience, and the like.

For the credit card application, if a particular transaction is scored, or classified, as fraudulent, it is desirable to provide an explanation for the classification, in particular, the input variables that most significantly caused the resulting score. Likewise for the loan application it is desirable to provide an explanation of the input variables that lead to a denial of credit.

More generally then, it is desirable to determine first, which input variable alone most causes one to expect the neural network score generated for a particular observation, and second, which other input variable(s) most causes one to expect the neural network score generated for a particular observation? Such explanations for the score produced by a neural net are useful prior to taking specific actions based on the score, for example to ensure compliance with company procedure, legal requirements, and the like.

Various methods have been developed in an attempt to provide explanations for neural net scores. Some approaches attempt to provide explanations by determining which input variable(s), if alone missing from the input observation, would most alter the neural network score. The method essentially creates additional observations for each input variable by replacing the value of that input variable with a population average value from a known population, such as the training data set. Each fabricated input is scored and compared with the score of the real observation. The variable when replaced with its population average value that scores most differently from the real observation score is identified as the most significant variable.

This type of method has several problems. First, this method requires iterative re-scoring, using the created values for each input variable. For example, if there are 100 input variables, then there should be 100 re-scorings for a single observation. In a high throughput environment, such as in online transaction processing for credit card transactions, where thousands, or tens of thousands of observations are processed in an hour, observations must be scored too rapidly to allow time for such re-scoring of each additional neural net inputs at explanation time. The time required to re-score the observation for the additional inputs is simply too great for the constraints of the application domain. This limits the use of explanations to only a selected number of observations.

Second, by comparing with scores at the population averages, this method assumes the neural network model is effectively linear, which is not often true. Finally, if an observation is very different from those seen during modeling, basing reasons on scores of fabricated neural net inputs alone can produce highly unreliable score explanation.

Accordingly, it is desirable to provide a mechanism for providing explanations of neural network scores that is sufficiently fast that it is capable of use in high throughput systems where an explanation of many or most observations is desired. It is also desirable to provide an explanation mechanism that does not assume an underlying linearity to the neural net modeling function.

SUMMARY OF THE INVENTION

The present invention overcomes the limitations of existing systems by providing a system, method, and product that enables the fast determination of an explanation of a neural net score for any particular input data set having any number of input variables.

In one aspect, the invention provides a software product in the form of an explanation tool. The explanation tool takes a set of historical observations, such as those used to train a neural net, and for each input variable, places the output score from the neural net into one of a selected number of percentile bins, according to the value of the input variable. A set of such percentile bins is produced for each input variable, each percentile bin defined by an upper and lower boundary value for the values of the input variable for the bin. The upper and lower boundary values of each bin are likely to be different for each input variable.

The number of percentile bins is selected by the user. For example, it may be useful to use three bins for each input variable, a "high" bin, a "medium" bin, and a "low" bin. A given input variable values will have a score in one of these three ranges, and the neural net score for the observation containing that input variable value is placed in the bin. There are at most N×M bins where N is the number of input variables in an observation, and M is a maximum number of desired bins. The number of bins for an input variable is less 'than the maximum M, and adjustable to ensure a minimum number of observations per bin. Where there are K observations, there are at least K/M observations in each percentile bin.

Each input variable, and each percentile bin, may be associated with an explanation. An explanation of an input variable describes the definition, purpose, or significance of the variable. An explanation of a percentile bin describes the meaning of an input variable having a value in that percentile bin. For example, if an input variable is "Amount of Transaction" a percentile bin that holds the largest values for this input variable may have an explanation such as "The amount of the transaction is too high."

For each percentile bin, an average, mean, or other expected neural net score is determined for the scores in the percentile bin, and this expected neural net score is assigned to the percentile bin. At this point, preprocessing is complete, and an explanation of any new observation may be quickly generated.

To generate an explanation, first the new observation is scored by the neural network to produce a new neural network score. For each input variable in the observation, the value of the input variable of the new observation is compared with the boundary values for the percentile bins associated with the input variable to identify the percentile bin in which the value of the input variable falls. The expected neural network score associated with this percentile bin is retrieved, and compared with the new neural network score. This process is repeated for each input variable in the observation.

The input variable for which the expected neural network score of the percentile bin is closest to the actual neural network score is the most significant variable, and the explanation associated with that percentile bin, and if available, input variable is provided. The explanations of percentile bins having the next closest expected neural network score may also be provided as secondary explanations.

This approach provides numerous benefits over existing systems and methods. First, the invention provides an extremely fast means of determining the explanation for a neural network score. This is because only simple lookup operations are required during runtime analysis, rather than the time consuming re-scoring of each input variable with artificial inputs as conventionally required. This allows a large number of observations to be "explained", rather than only a selected number.

Second, the invention applies to multiple output models on discrete or continuous inputs, with no assumption about the linearity of the underlying neural net model.

Finally, the invention is independent of the neural net architecture itself, and may be used with any neural net design. This allows the invention to be efficiently implemented with any type of neural network, including those already operating in existing systems. This allows operators of an existing system to improve the utility of their existing neural networks.

DETAILED DESCRIPTION OF THE INVENTION

Figure 1:
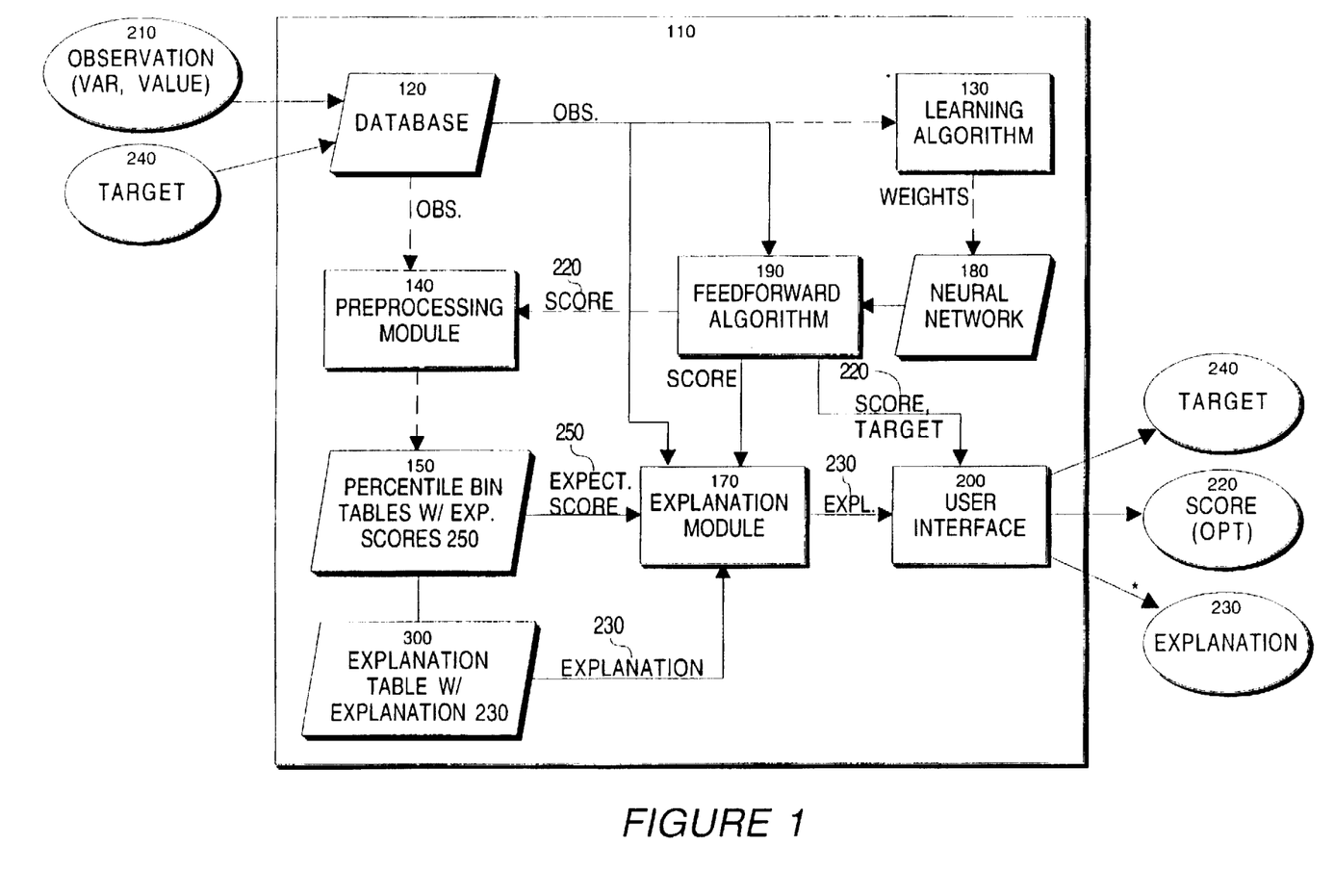
FIG. 1 is an illustration of a system in accordance with one embodiment of the present invention.

Referring now to FIG. 1, there is shown block diagram of one embodiment of a system in accordance with the present invention. The system 100 receives some number of observations 210 as inputs, and provides, through a suitable user interface 200, a score 220 for an observation 210, and one or more explanations 230 that describe the reasons for the score 220.

The system 100 operates on a conventional computer 110 and operating system; suitable computers 110 include Sun Microsystem's workstations using the Solaris 2.4 operating system.

The system 100 includes a database 120 that stores the observations 210. An observation 210 is formed from a set of values for some number of input variables. The input variables may be continuous, Boolean, or discrete. Symbolic variables may be to mapped discrete values by the systems designer. The database 120 stores the observations 210 in any useful manner, such as a relational database model. In the preferred embodiment, the database 120 is designed for online transaction processing environments, such as credit card transaction analysis, and the similar application domains requiring high throughput. It these in applications, that ability of the present invention to provide rapid determinations of the explanations 230 for an observation's score 220 becomes most useful. Preferably then, the computer 110 is coupled through a conventional high speed data network to receive observations 210 from remote computers.

The system 100 includes a neural network 180. The neural network 180 may have an arbitrary number of layers, and, with any arbitrary linear or non-linear bounded activation functions. Selected observations 210 in the database 120 (a training set) are processed by a learning algorithm 130 to determine the weights for the neural network 180. The learning algorithm 130 is typically a back propagation algorithm.

To produce a score 220 for an observation 120 with the neural network 180, a feedforward algorithm 190 applies the input variables of the observation 120 to the neural network 180 in a conventional manner. The score 220 is a score value for an output variable. The score 220 is typically used to model some target variable 240. For example, in a credit card fraud detection application, the score 220 may be used to determine a target Boolean variable, indicating the presence or absence of fraud in the transaction. The target variable 240 may be subsequently input for an observation 210.

In accordance with one embodiment of the present invention, the system 100 includes a preprocessing module 140 and an explanation module 170. The preprocessing module 140 receives some number of observations 210 from the database 120 in conjunction with the scores 220 from the feedforward algorithm 180 for these observations 120. The preprocessing module 140 creates a table of percentile bins 150 from the values of the input variables of the received observations 120, and the corresponding scores 220. Dataflow for preprocessing is shown as dashed lines.

More particularly, for each input variable a set of percentile bins is created. Each percentile bin 150 is associated with an expected score 250 for the observation 120. The expected score 250 for a percentile bin is a representative score based on actual scores 220 of observations 120 for which the value of the input variable is within a range of percentiles associated with the percentile bin.

At run time, reasons for the score 220 of a new observation 210 are provided by the explanation module 170. The explanation module 170 compares the score 220 for the observation with the expected score 250 in the percentile bin 150 for the input variable that contains the value of the input variable. The explanations 230 associated with the percentile bin(s) 150 having the expected score 250 that most closely matches the actual score 220 are selected, and provided to the user interface 200 for display to a user.

Figure 2:
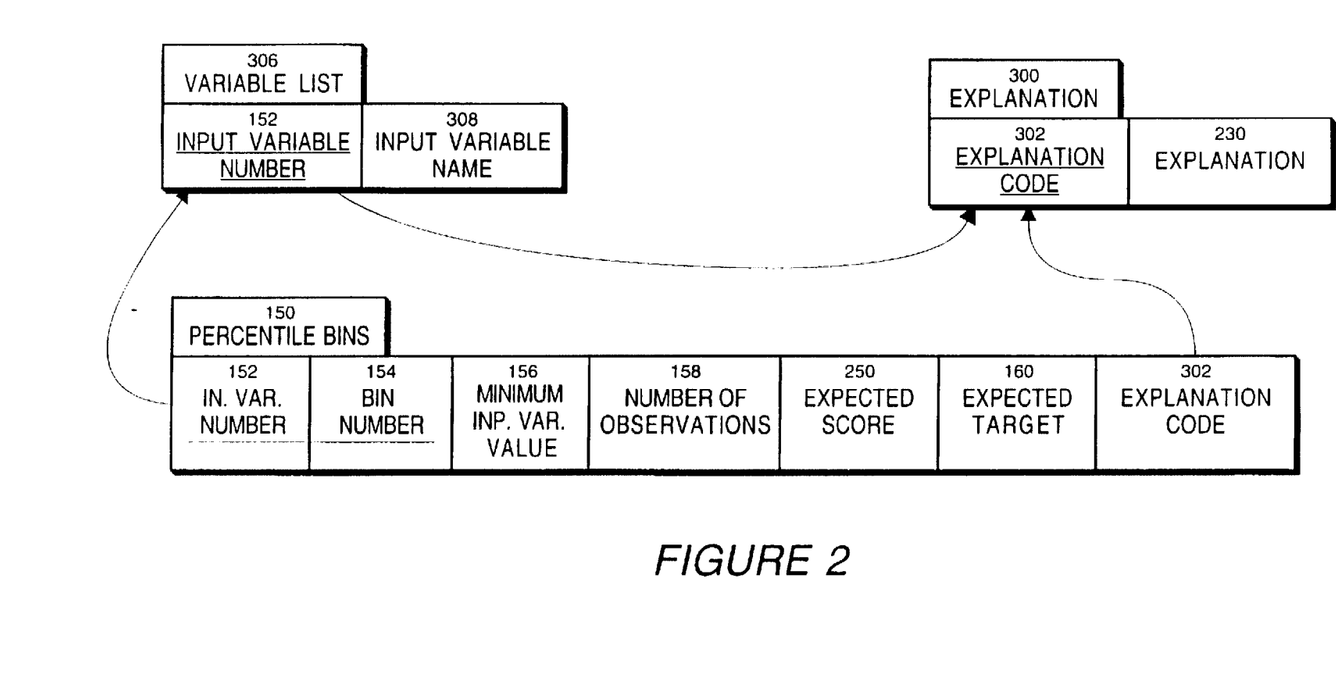
FIG. 2 is a schematic representation of a table of percentile bins and explanations.

Referring now to FIG. 2, there is shown a schema of the table of percentile bins 150 created by the preprocessing module 140. The table includes attributes for an input variable number 152, which a foreign key to a table 306 listing the input variables in the database, each having an input variable number 152 and name 308. The input variable number 152 in either table may be used as a foreign key to the explanation table 300 for providing explanations 230 of variables, such as definitions, significance, use, and the like.

Each input variable in the table has a determined number of percentile bins 150, and each percentile bin 150 has a bin number 154. The bin number 154 usefully identifies the ranking of the bin, the lowest bin number 154 being the highest ranked bin. The number of percentile bins is established by maximum number M of percentile bins 150. M is determined by the systems designer and should be selected such that M<K, where K is the number of observations. The number of bins may be less than M through adjustable binning, further described below. In one embodiment, M is set at 20, and K is preferably >1,000. M, the maximum number of percentile bins, establishes the minimum number of observations 210 used to establish the expected score 250 of each bin, as:

Minimum number of observations per bin=K/M.

The maximum value (exclusive) of a bin is the lowest value (inclusive) of the next higher ranked bin. The highest ranked bin has no maximum value and the lowest ranked bin has no lowest value.

The number of observations field 158 stores how many observations 210 were used to determine the expected score 250 for the percentile bin. This quantity should always be greater than the minimum number of observations.

Ideally, each percentile bin has an explanation 230 associated with it. In a relational model as shown here, the explanation 230 is associated by an explanation code 302 which is a foreign key to an explanation table 300. In other embodiments, other forms of reference may be used. The explanations 230 are provided by the system designer and are dependent on the application domain. In some application domains it may not be necessary for each percentile bin 150 to have an explanation 230. For example, in a credit card fraud detection system, scores 220 in excess of some threshold score are classified as fraudulent transactions, and transactions with scores 220 less than the threshold are authorized. In this application, it is useful only to know the explanation of fraudulent transactions. Thus, only those percentile bins 150 that have expected scores 250 in excess of the threshold have explanation 230 associated with them. Again, this decision is implementation dependent, and not a limitation of the invention.

Figure 3:
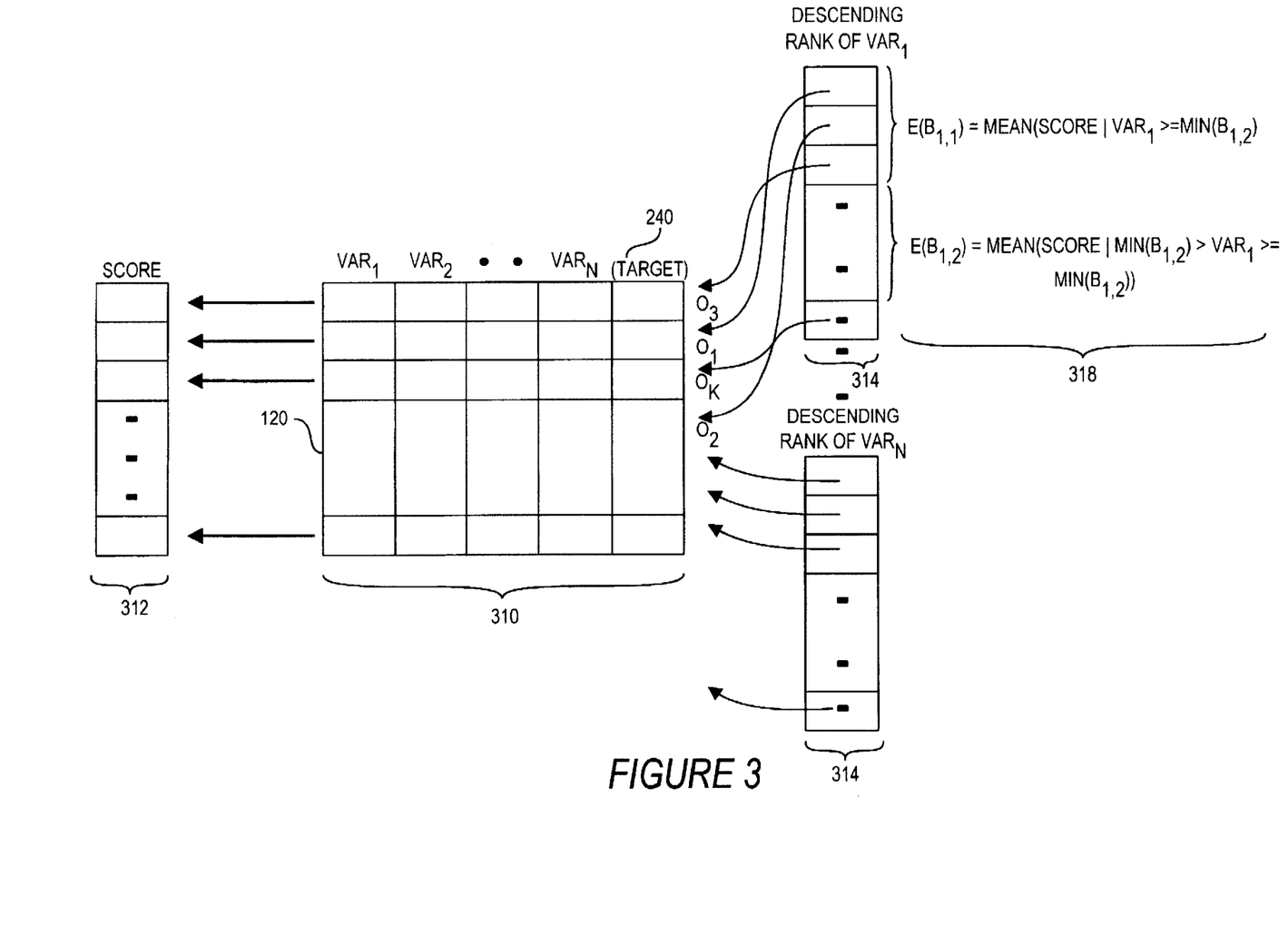
FIG. 3 is an illustration of the data relationships in the process of creating the table of percentile bins.

Referring now to FIG. 3, the table of percentile bins 150 and expected scores 250 are constructed by the preprocessing module 140 as follows.

First, a number K of observations 120 are selected 310 as the base, or training set for the percentile tables 150. The number K of observations should be suitably large for the application domain. These K observations 120 are scored 312 by the neural network 180 and have associated scores 250.

There are N input variables for each observation 120. For purposes of notation, value of each input variable is here referenced as $Var_j$ where j=1 to N. For each of the N input variables $Var_j$, the selected observations 120 are ranked (sorted) 314 in descending order by the value of the input variable $Var_j$. This will produce N ranked sets of observations 120.

For each input variable $Var_j$ the preprocessing module 140 determines the range of observations 120 in the ranked set that defines each percentile bin 150 for that input variable. Each percentile bin 150 will have at least K/M observations 120.

More particularly, for K observations $O_x$, x=1 to K ranked by the value of input variable $Var_j$, the $i^{th}$ percentile bin $B_j$ for this input variable $Var_j$ is $B_{j,i}$, and has as its minimum value 156 the observation $O_x$:

$$\min(B_{j,i})=O_{(i*K)/M} \qquad \text{Eq. 1}$$

The smallest value of the input variable in each of its (100/M)% ranked observations define a percentile bin 150 of that input variable, except for the lowest ranked bin, which is defined by the minimum value of the second lowest ranked bin.

The expected score 250 for each percentile bin 150 is then determined 316 by the preprocessing module 140 from the scores 220 in the percentile bin 150 as:

$$E(B_{j,i})=\text{Mean}(\text{score}|Var_j>\min(B_{j,i})) \qquad \text{Eq. 2}$$

for i=1;

$$E(B_{n,i})=\text{Mean}(\text{score}|\min(B_{j,i-1})>Var_j>\min(B_{j,i})) \qquad \text{Eq. 3}$$

for 1<i≤(M−1);

where $E(B_{j,i})$ is the expected score 250 for percentile bin $B_{j,i}$. The lowest ranked bin is defined by the preprocessing module 140 by the minimum value of the second lowest ranked bin 150. Each percentile bin $B_{j,i}$ has at least (K*i)/M scores 220 associated with it, excepts for the lowest ranked bin $B_{j,M}$, which may have less.

Where M is the number of percentile bins, the expected score 250 is determined by the preprocessing module 140 as the sum of scores 220 in the multiplied by (M/K). Note that the preprocessing module 140 does not store values of the input variable $Var_j$ itself in the percentile bin 150, but merely uses them to define the boundaries of the percentile bin 150. It should also be noted that the preprocessing module 140 may create the ranked set of observations 210 for each input variable prior to (separate loops), or in conjunction with (nested loops) with determining the percentile bin expected scores 250.

The preferred embodiment of the preprocessing module 140 uses a mean calculation for the expected score 250. However, the invention is not limited to the use of mean for the expected score 250, and other summary measures, such as mode, median, and the like may also be used.

In other words, the expected score 205 for a percentile bin 150 is the expected output for the neural network 180 given a value for the input variable that falls within the percentile bin 150.

The above rankings by the preprocessing module 140 can produce ties at the borders between percentile bins 150. This may happen, for example, for discrete input variables. It is preferable to keep all observations 120 of a particular value of an input variable in one percentile bin 150 or the other. To do so, the scores 220 of observations 150 for which value of the input variable is at minimum value 156, are moved into the next higher ranked percentile bin.

However, this adjustment results in un-even percentile bin sizes, that is an unequal number of observations 158 for each bin. If at least K/M observations 120 are needed in each percentile bin 150, and the number of observations 158 is less K/M, the preprocessing module 140 merges the lowest ranked percentile bin 150 with the second lowest ranked percentile bin 150. The the preprocessing module 140 determines the expected score 250 in the resulting percentile bin 150 as above, based on the number of observations 158 in the merged percentile bin 150. The merging of bins occurs with the lowest, and second lowest ranked bins because the highest ranked bin through the second lowest ranked bin have at least the minimum number of observations, since the bins are created from the "top" of the ranked set of observations. Thus, only the lowest ranked bin will have less than the minimum number of observations 210 prior to adjustment. This adjustable binning by the preprocessing module 140 is particularly useful for discrete input variables.

Accordingly, because M merely establishes a maximum number of percentile bins 150 for an input variable, each input variable may have any number percentile bins 150 such that the minimum number of observations are used to determine the expected score 250 for each bin.

In addition to determining an expected score 250, if target values 240 are available for the observations 120 (these may be subsequently obtained) then the preprocessing module 140 may determine an expected target 160 for for each percentile bin 150 in the manner described above for the expected score 250, using the target value 240 in place of the score 220. The expected score 250 for a percentile bin is tested by the preprocessing module 140 for how closely it approximates the expected target 240. One implementation of this determination by the preprocessing module 140 uses a simple a confidence threshold e, and determines whether:

$$|E(B_{j,i})-T(B_{j,i})| \le e \quad \text{Eq. 4}$$

where $T(B_{j,i})$ is the expected target 160 for percentile bin $B_{j,i}$. If this value exceeds e for any percentile bin 150, then either the number of bins for the input variable is decreased, or K is increased, and the percentile bins for that input variable are redetermined.

In summary then, the primary association created by the preprocessing module 140 in the table of percentile bins 150 is the relationship between the expected score 250 and the explanation 230 for each percentile bin. The provision of a bin number 154 and variable number 152 is useful for indexing and retrieving the expected scores 250 and explanation codes 302. The number of observations 158 is useful for defining the percentile bins 150, and may be used to support the statistical accuracy of the expected score in a bin at some future time, though this is not necessary for the purposes of the invention. The minimum value 156 is used by the explanation module 170 to identify the appropriate percentile bin from which to retrieve the expected score 250.

Figure 4:
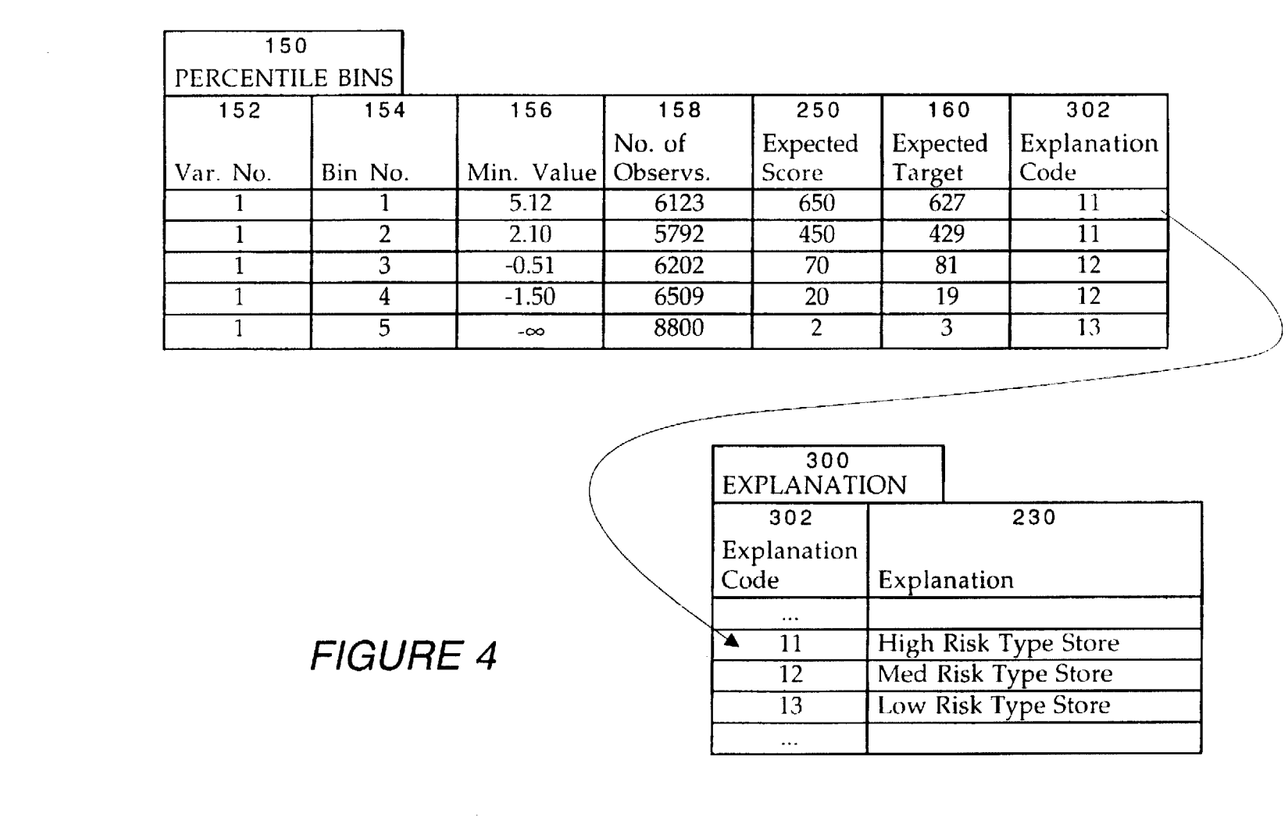
FIG. 4 is an example of a table of percentile bins for a single input variable.
Figure 6:
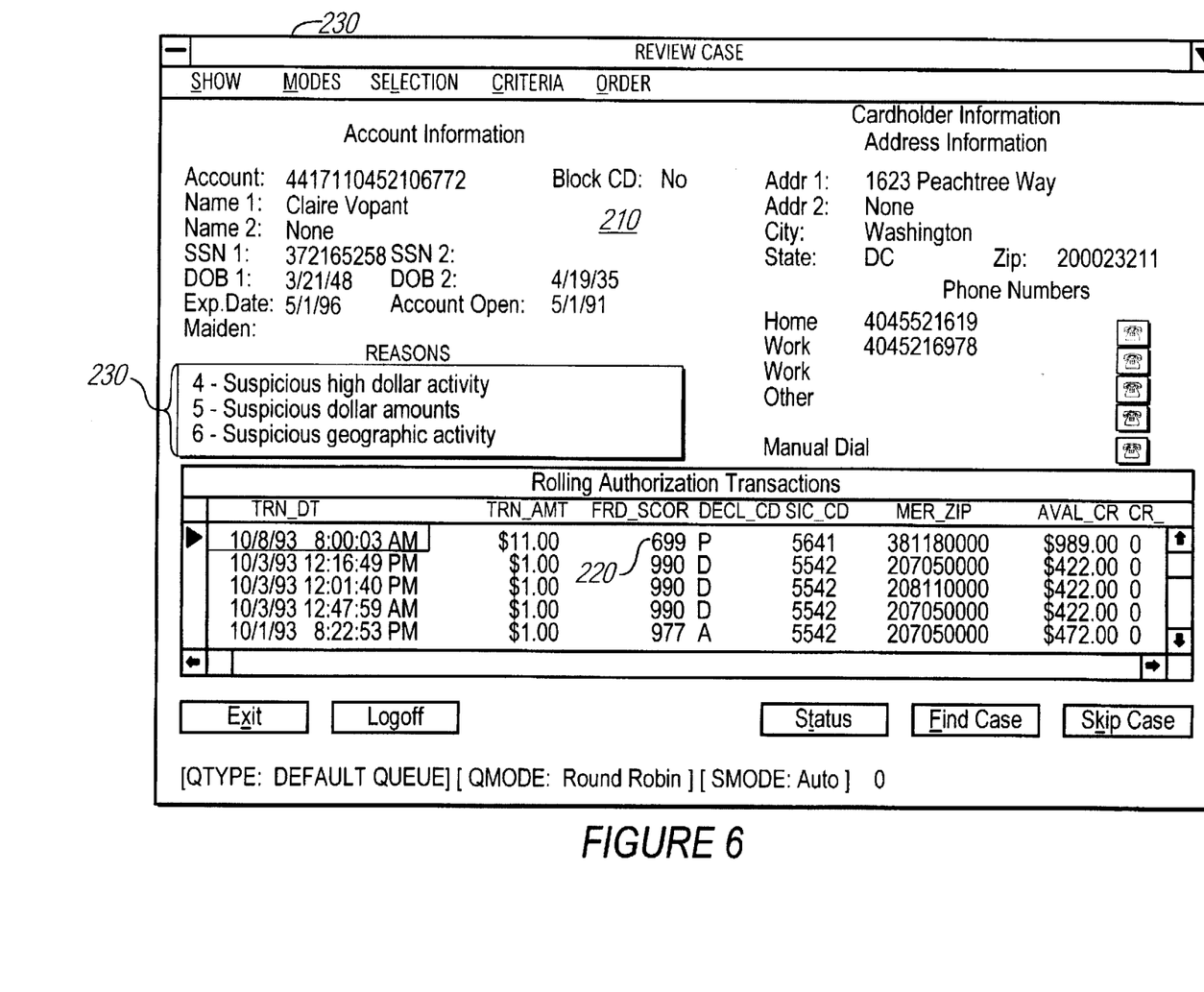
FIG. 6 is an illustration of an exemplary user interface for the explanation tool of the present invention.

FIG. 4 illustrates a sample table of percentile bins 150 for a single input variable, "SIC_RISK" in the credit card fraud application, described with respect to FIG. 6, in association with explanations 230 for the percentile bins 150. Variable number "1" refers to the "SIC_RISK" variable, as established in a separate table. The bin numbers 154 indicate that there are 5 percentile bins 150 for this input variable. Each percentile bin 150 has a number 156 of observations from the total set of observations 210 use to generate the table 150. An expected score 250 is held for each bin.

In FIG. 4, each of the percentile bins 150 includes an explanation code 302 to establish the association to a particular explanation 230 in the explanation table 300. Only a portion of the explanation table 300 Percentile bin 1 has an explanation 230 that observations 210 for which the value of the input variable SIC_RISK was greater than 5.12 are credit card transactions taking place in a high risk type store. Note that bins no. 1 and 2 share the same explanation code 302 and hence explanation 230, even though they define separate bins 150.

Figure 5:
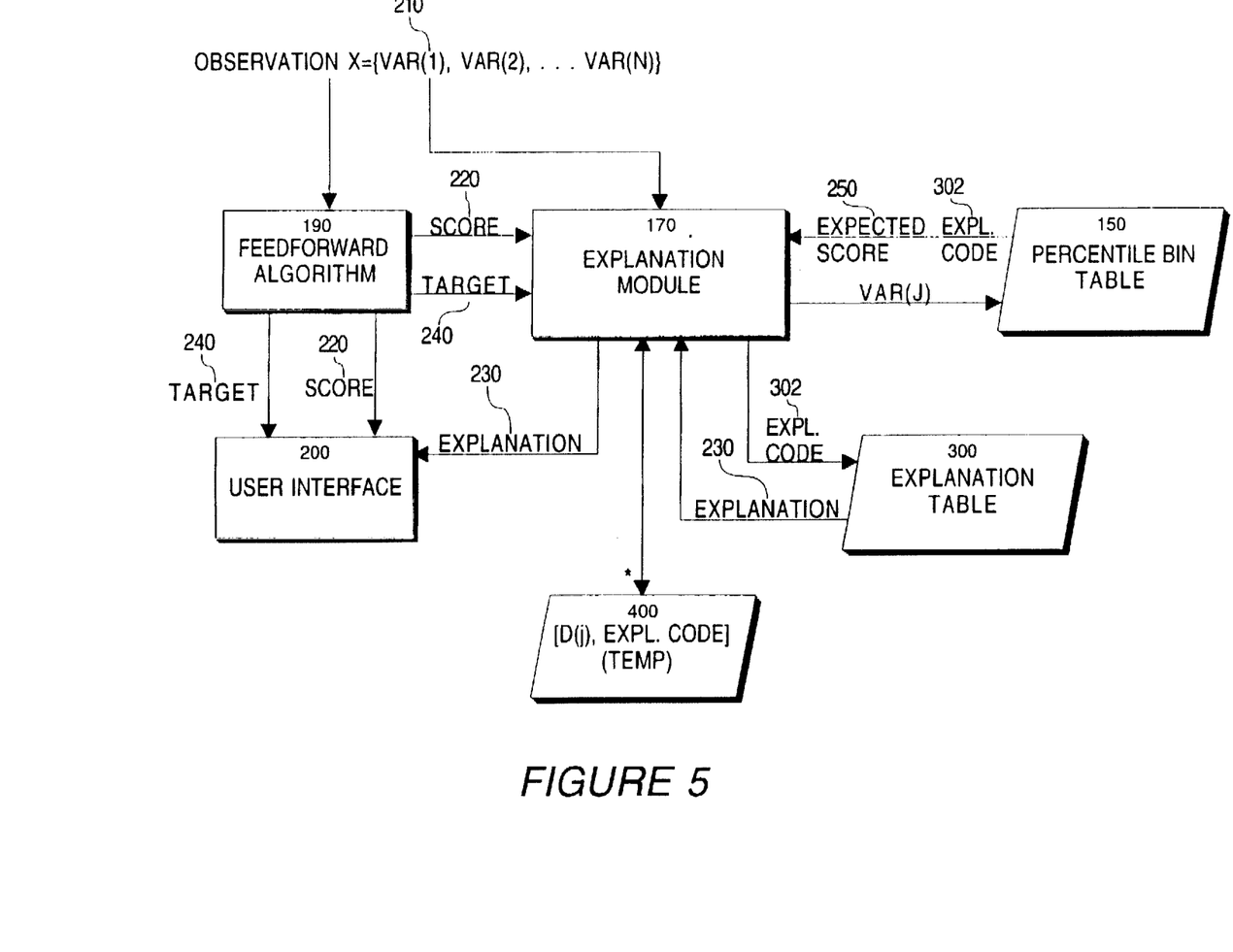
FIG. 5 is a dataflow diagram of the process of determination an explanation for a new observation.

Referring now FIG. 5, and generally to FIG. 1, the rapid determination of explanations 230 for a new observation by the explanation module 170 is follows. A new observation 210 is received into the database 120. The observation 210 may be entered as direct data input manually, or through automated data capture, for example, from a point of sale system, or other data acquisition device. The observation 210 has values for some number of the input variables (values for all input variables is not necessary, as with conventional neural nets).

The new observation 210 is provided to both the feedforward algorithm 190 and the explanation module 170. The feedforward algorithm 190 propagates the observation 210 through the neural network 180 and produces a score 220, and a target 240 which may be used to classify the observation 220 with a target variable 240. The score 220, and if appropriate, the target 240, is provided to both the explanation module 170 and the user interface 200.

The explanation module 170 traverses the table of percentile bins 150 for each of the input variables $Var_j$ for the observation 210. For the input variable $Var_j$, the explanation module 170 traverses the percentile bins $B_{j,i}$, where i indexes the percentile bins 150 for input variable $Var_j$ in the table 150. The explanation module 170 compares $Var_j$ with the minimum value 156 for the percentile bin $B_{j,i}$ to identify the percentile bin 150 that contains the value of that input variable. The expected score 250 for that particular percentile bin 150 is retrieved, and the difference between the expected score 250 and the actual score 220 determined. This may be notated as:

$$D_j = |E(B_{j,i}) - S|$$

where S is the score 220 from the new observation 120, and $D_j$ is the difference. The difference result $D_j$ is temporarily stored in a table 400 along with the explanation code 302 from the percentile bin $B_{j,i}$. The table 400 of difference results is not persistently stored, since it is useful only for the particular observation 210. This difference result $D_j$ is determined for all of the input variables $Var_j$.

Optionally, a confidence threshold c is used to select only those expected scores 250 that are sufficiently close to the actual score 220 that input variable may be said to have significantly contributed to the actual score 220. Thus, only those difference results $D_j < c$ are stored in the table 400.

The resulting table 400 of difference results is then sorted, low values to high. The lowest difference result $D_1$ represents the input variable that most strongly contributes to the actual score 220 for the observation, and further, the value of that input variable, as falling within a particular percentile bin, has a particular explanation 230 associated with it.

Accordingly, the explanation 230 that is associated with this difference result $D_1$ is then retrieved from the explanation table 300. Optionally, the explanations 230 associated with the remaining difference results $D_j$ in the table may also be retrieved. These difference results represent the input variable percentile bins 150 having the second through jth 'closest expected score 250.

These explanations 230 for the observation 210 are provided to the user interface 200. The user interface 200 provides the target 240 and explanation(s) 230 to the user. Optionally, the score 220 may also be provided to the user, if useful in a specific application. Alternatively, the explanation module 170 provides the explanation code 302 to the user interface 200, which then itself performs the lookup on the explanation table 300 for the explanation 230 corresponding to the explanation code. In either implementation, the user interface 200 provides the explanation 230 to the user of the input variables and values thereof that most significantly determined the score 220 for the observation 120.

This process of providing the explanations 230 for new observations 210 is extremely rapid since each observation 210 need only be scored once with the neural network 180, rather than N additional times, where N is the number of input variables, as with conventional systems. This makes a system operating in accordance with the present invention suitable for high throughput applications.

The user interface 200 and explanation module 170 are shown in FIG. 1 as part of the computer 110 that operates the other elements of the present invention. In preferred implementations, using networked computers, the user interface 200 and explanation module 170 are provided in a separate client computer, with the computer 110 acting as a server computer, and providing access to the table of percentile bins 150.

Referring now to FIG. 6, there is shown an example of a user interface 200 for providing explanations 230 for observations 210. The user interface 200 here is for an implementation of the system 100 in a credit card authorization and fraud detection system. The user interface 200 here shows various information about an individual card holder, such as account number, name, date of birth, address, and the like, that may be obtained from an enterprise database coupled to the system 100 (not shown in FIG. 1). In this application, an observation 210 is a credit card transaction subject to authorization and the determination of whether the transaction is fraudulent. Not shown, but applicable in this application, are input variables, such as the amount of purchase, the geographic location, prior purchase amounts, and the like for the observation 210. In this application domain, the target variable is whether the transaction is fraudulent. If this is the case, it is desirable to know the reason, or explanation of which input variable(s) was the primary reason for this determination. In FIG. 6, the user interface 200 illustrates the explanations 230 for one such determination. Here, the three most significant explanations 230 are provided. These explanations 230 are those associated with the percentile bins for the input variables of transaction dollar amount, previous transaction amounts, and geographic location of transaction. In this application, the actual score 220 produced by the neural network 180 is 699 and appears under the column FRD_SCOR.

I claim:

1. A computer system for providing explanations of scored values for observations, comprising:

a database storing a plurality of observations, each observation having a value for each of a plurality of same input variables, and a score value for an output variable produced by a neural network;

a neural network that receives observations and produces an output score for the observation based on the values of the input variables;

a computer readable memory including:

a table including for each of the input variables, a set of a variable number of percentile bins, each percentile bin of an input variable associated with an expected score value for the output variable, the expected score value determined by an average of score values of observations having values for the input variable within the percentile bin, at least one percentile bin of each input variable associated with an explanation of the percentile bin;

a computer program that receives a new observation and score value from the neural network and determines from the table the percentile bin with an expected score value that is closest to the score value of the new observation, and provides the explanation, if any associated, with the determined percentile bin to a user.

2. In a computer system including a database storing a plurality of observations, each observation having a value for selected ones of a plurality of input variables, and a score value for an output variable determined with respect to the values of the input variable, a computer implemented method of providing explanations for the score values for new observations, comprising:

storing a table including for each of the input variables, a variable number of percentile bins, each percentile bin of an input variable associated with an expected score value for the output variable, the expected score value determined as a function of score values of observations having values for the input variable within the percentile bin;

for each input variable, associating with each of selected ones of the percentile bins of the input variable, an explanation of the values for the input variable within the percentile bin;

receiving a new observation;

determining a score value for the new observation;

determining from the table the percentile bin with an expected score value that is closest to the score value of the new observation; and providing to a user the explanation, if any, associated with the determined percentile bin.

3. The method of claim 2, wherein storing a table includes:

for each input variable:

ranking the score values of the observations according to the value of the input variable for the observation;

determining a number of percentile bins for the input variable, each percentile bin having a ranking; and determining for each percentile bin an expected score value for the output variable for all observations having values of the input variable within the percentile bin.

4. The method of claim 3, further comprising:

determining whether the number of observations in a lowest ranked bin is less than a minimum number of observations; and responsive to the number of observations being less than the minimum number of observations, merging the lowest ranked bin with a second lowest ranked bin, and redetermining the expected score value for the output variable for all observations having values of the input variable within the merged percentile bins.

5. The method of claim 2, further comprising:

receiving for each observation a value of target variable;

for each input variable:

determining for each percentile bin of the input variable an expected target value for the target variable for all observations having values of the input variable within the percentile bin;

determining whether the expected score value for the output variable substantially approximates the expected target value;

responsive to the expected score value not substantially approximating the expected target value, either:

increasing the number of observations and redetermining the expected scores for each percentile bin; or, decreasing the number of percentile bins and redetermining the expected scores for each remaining percentile bin.

6. The method of claim 2 wherein determining from the table the percentile bin with an expected score value that is closest to the score value of the new observation comprises:

receiving the observation;

for each input variable in the observation:

obtaining an expected score from the percentile bin of the input variable within the table that contains the value of the input variable; and selecting from the obtained expected scores the expected score that is closest to the score value of the new observation.

7. The method of claim 6, further comprising:

selecting from the obtained expected scores, the expected scores that are within a threshold value of the actual score; and providing for each of the selected scores, an explanation associated with the percentile bin from which the expected score was obtained to explain each of the selected scores.

8. In a computer system including a database storing a plurality of observations, each observation having a value for selected ones of a plurality of input variables, and a score value for an output variable determined with respect to the values of the input variable, a computer implemented method of providing explanations for the score values for new observations, comprising:

creating a table including for each of the input variables, a set of a variable number of percentile bins, each percentile bin of an input variable associated with an expected score value for the output variable, the expected score value determined by averaging score values of observations having values for the input variable within the percentile bin, wherein the table is created by:

for each input variable:

ranking the score values of the observations according to the value of the input variable for the observation;

determining a number of percentile bins for the input variable, each percentile bin having a ranking;

determining for each percentile bin an expected score value for the output variable for all observations having values of the input variable within the percentile bin; and determining whether the percentile bin is to be associated with an explanation, and if so, associating the percentile bin with an explanation;

receiving a new observation;

determining a score value for the new observation;

determining from the table the percentile bin with an expected score value that is closest to the score value of the new observation;

providing to a user the explanation, if any, associated with the determined percentile bin;

receiving for each observation a value of a target variable; and for each input variable:

determining for each percentile bin of the input variable an expected target value for the target variable for all observations having values of the input variable within the percentile bin;

determining whether the expected score value for the output variable substantially approximates the expected target value;

responsive to the expected score value not substantially approximating the expected target value, either:

increasing the number of observations and redetermining the expected scores for each percentile bin; or, decreasing the number of percentile bins and redetermining the expected scores for each remaining percentile bin.

9. In a computer system including a database storing a plurality of observations, each observation having a value for selected ones of a plurality of input variables, and a score value for an output variable determined with respect to the values of the input variable, a computer implemented method of providing explanations for the score values for new observations, comprising:

creating a table including for each of the input variables, a set of a variable number of percentile bins, each percentile bin of an input variable associated with an expected score value for the output variable, the expected score value determined by averaging score values of observations having values for the input variable within the percentile bin, wherein the table is created by:

for each input variable:

ranking the score values of the observations according to the value of the input variable for the observation;

determining a number of percentile bins for the input variable, each percentile bin having a ranking;

determining for each percentile bin an expected score value for the output variable for all observations having values of the input variable within the percentile bin; and determining whether the percentile bin is to be associated with an explanation, and if so, associating the percentile bin with an explanation;

receiving a new observation;

determining a score value for the new observation;

determining from the table the percentile bin with an expected score value that is closest to the score value of the new observation by:

for each input variable in the new observation, obtaining an expected score from the percentile bin of the input variable within the table that contains the value of the input variable;

selecting from the obtained expected scores the expected score that is closest to the score value of the new observation;

selecting the percentile bin having the closest expected score; and providing to a user the explanation, if any, associated with the selected percentile bin.

10. The method of claim 9, further comprising:

selecting from the obtained expected scores, the expected scores that are within a threshold value of the actual score; and providing for each of the selected scores, an explanation associated with the percentile bin from which the expected score was obtained.

11. In a computer system including a database storing a plurality of observations, each observation having a value for selected ones of a plurality of input variables, and a score value for an output variable determined with respect to the values of the input variable, a computer readable memory storing a computer program therein for configuring a processor of the computer system to create a table of percentile bins associated with explanations for the input variables for providing explanations for the score values for new observations, the computer program configuring the processor to:

provide a score value for the output variable of a selected number of observations based on the values of the input variables of each observation; and for each input variable:
rank the score values of the observations according to the value of the input variable for the observation;
determine a number of percentile bins for the input variable, each percentile bin having a ranking;
determine for each percentile bin an expected score value for the output variable for all observations having values of the input variable within the percentile bin; and
determine whether the percentile bin is to be associated with an explanation, and if so, associate the percentile bin with an explanation of the input variable for the percentile bin and the values of the input variable within the percentile bin.

12. The computer readable memory of claim 11, further configuring the processor to:
determine whether the number of observations in a lowest ranked bin is less than a minimum number of observations; and
responsive to the number of observations being less than the minimum number of observations, merge the lowest ranked bin with a second lowest ranked bin, and redetermine the expected score value for the output variable for all observations having values of the input variable within the merged percentile bins.

13. A computer readable memory, for use with a processor and a database storing a plurality of observations, each observation having a value for selected ones of a plurality of same input variables, and a score value for an output variable determined with respect to the values of the input variable; and a table including for each of the input variables, a set of a variable number of percentile bins, each percentile bin of an input variable associated with an expected score value for the output variable, the expected score value determined as a function of score values of observations having values for the input variable within the percentile bin, at least one percentile bin of each input variable in the table associated with an explanation of the input variables and the values of the input variable within the percentile bin, the computer readable memory storing a computer program for configuring and controlling the processor to provide explanations for the score values for new observations by performing the steps of:

receiving a new observation;
determining a score value for the new observation;
determining from the table the percentile bin with an expected score value that is closest to the score value of the new observation; and
providing to a user the explanation, if any, associated with the determined percentile bin.

14. A computer system for identifying at least one input variable significantly contributing to a score value for an individual observation, the system comprising:
a database storing a plurality of training observations, each training observation having a value for each of a plurality of input variables, and a score value for an output variable;
a scoring module that receives observations, and produces a score value for the output variable for the observation based on values of the input variables for the observation; and
a computer readable memory including:
a table including for each of the input variables, a variable number of percentile bins, each percentile bin of an input variable associated with an expected score value for the output variable, the expected score value determined as a function of score values of training observations having values for the input variable within the percentile bin; and
a computer program that receives a new, individual observation and score value from the scoring module and selects from the table the percentile bin with an expected score value that is closest to the score value of the new, individual observation, and identifies the input variable associated with the selected percentile bin.

15. In a computer system including a database storing a plurality of observations, each observation having a value for selected ones of a plurality of input variables, and a score value for an output variable determined with respect to the values of the input variable, a computer implemented method of identifying at least one input variable that significantly contributes to the score value for a new observation, comprising:
storing a table including for each of the input variables, a variable number of percentile bins, each percentile bin of an input variable associated with an expected score value for the output variable, the expected score value determined as a function of score values of observations having values for the input variable within the percentile bin;
receiving a new observation;
determining a score value for the new observation;
selecting from the table the percentile bin with an expected score value that is closest to the score value of the new observation; and
identifying the input variable associated with the selected percentile bin.

16. A computer implemented method of identifying an input variable that significantly contributes to a score value of an observation, comprising:
receiving a plurality of training observations, each training observation having a value for each input variable, and a score value of an output variable determined as a function of the values of the input variables;
for each input variable:
sorting the training observations according to the value of the input variable;
segregating the sorted training observations into subsets;
determining for each subset, an expected score value determined as a function of the score values of the training observations in the subset;
receiving a new observation having values for the input variables;
scoring the new observation to produce a new score value; and
comparing the new score value with the expected score values of the subsets of training observations for the input variables, to identify the input variable having a subset of training observations with an expected score value closest to the new score value of the new observation.

17. The computer implemented method of claim 16, further comprising:

for each input variable, associating with each subset of training scores, an explanation of the input variable and the values of the input variable in the subset; and responsive to identifying the input variable having a subset of training observations with an expected score value closest to the new score value of the new observation, providing to a user the explanation associated with the subset of training observations.

18. In a computer system including a database storing a plurality of observations, each observation having a value for selected ones of a plurality of input variables, and a neural network score value for an output variable determined with respect to the values of the input variable, a computer implemented method of providing explanations for the neural network score values for new observations, comprising:

storing a table including for each of the input variables, a variable number of percentile bins, each percentile bin of an input variable associated with an expected score value for the output variable, the expected score value determined as a function of neural network score values of observations having values for the input variable within the percentile bin;

for each input variable, associating with each of selected ones of the percentile bins of the input variable, an explanation of the values for the input variable within the percentile bin;

receiving a new observation;

determining a neural network score value for the new observation;

determining from the table the percentile bin with an expected score value that is closest to the neural network score value of the new observation; and providing to a user the explanation, if any, associated with the determined percentile bin.

19. A computer readable memory, for use with a processor and a database storing a plurality of observations, each observation having a value for selected ones of a plurality of same input variables, and a neural network score value for an output variable determined with respect to the values of the input variable, the computer readable memory storing a computer program for configuring and controlling the processor to create a table of percentile bins associated with explanations for the input variables, for providing explanations for the neural network score values for new observations by performing the steps of:

providing a neural network score value for the output variable of a selected number of observations based on the values of the input variables of each observation;

for each input variable:

ranking the neural network score values of the observations according to the value of the input variable for the observation;

determining a number of percentile bins for the input variable, each percentile bin having a ranking;

determining for each percentile bin an expected neural network score value for the output variable for all observations having values of the input variable within the percentile bin; and determining whether the percentile bin is to be associated with an explanation, and if so, associate the percentile bin with an explanation of the input variable for the percentile bin and the values of the input variable within the percentile bin.

20. A computer readable memory, for use with a processor and a database storing a plurality of observations, each observation having a value for selected ones of a plurality of same input variables, and a neural network score value for an output variable determined with respect to the values of the input variable; and a table including for each of the input variables, a set of a variable number of percentile bins, each percentile bin of an input variable associated with an expected neural network score value for the output variable, the expected neural network score value determined as a function of score values of observations having values for the input variable within the percentile bin, at least one percentile bin of each input variable in the table associated with an explanation of the input variables and the values of the input variable within the percentile bin, the computer readable memory storing a computer program for configuring and controlling the processor to provide explanations for the neural network score values for new observations by performing the steps of:

receiving a new observation;

determining a neural network score value for the new observation;

determining from the table the percentile bin with an expected neural network score value that is closest to the neural network score value of the new observation; and providing to a user the explanation, if any, associated with the determined percentile bin.

21. In a computer system including a database storing a plurality of observations, each observation having a value for selected ones of a plurality of input variables, and a neural network score value for an output variable determined with respect to the values of the input variable, a computer implemented method of identifying at least one input variable that significantly contributes to the neural network score value for a new observation, comprising:

storing a table including for each of the input variables, a variable number of percentile bins, each percentile bin of an input variable associated with an expected score value for the output variable, the expected score value determined as a function of neural network score values of observations having values for the input variable within the percentile bin;

receiving a new observation;

determining a neural network score value for the new observation;

selecting from the table the percentile bin with an expected score value that is closest to the neural network score value of the new observation; and identifying the input variable associated with the selected percentile bin.

\* \* \* \* \*